(12) United States Patent
Reisser

(10) Patent No.: US 7,600,490 B2
(45) Date of Patent: Oct. 13, 2009

(54) INTERNAL COMBUSTION ENGINE

(76) Inventor: Heinz-Gustav A. Reisser, 44494 S.R. 541, Coshocton, OH (US) 43812-0655

( * ) Notice: Subject to any disclaimer, the term of this patent is extended or adjusted under 35 U.S.C. 154(b) by 127 days.

(21) Appl. No.: 11/442,401

(22) Filed: May 30, 2006

(65) Prior Publication Data

US 2007/0277765 A1  Dec. 6, 2007

(51) Int. Cl.
*F01C 9/00* (2006.01)
(52) U.S. Cl. .................... 123/18 R; 123/18 A
(58) Field of Classification Search ............... 123/18 A
See application file for complete search history.

(56) References Cited

U.S. PATENT DOCUMENTS

| | | | | |
|---|---|---|---|---|
| 1,497,481 A * | 6/1924 | Bullington | .................... | 418/37 |
| 1,892,474 A * | 12/1932 | Satrum | ........................ | 418/36 |
| 2,123,279 A * | 7/1938 | George et al. | .................. | 74/48 |
| 2,155,249 A * | 4/1939 | Bancroft | ........................ | 418/37 |
| 2,387,467 A * | 10/1945 | Reiter | ...................... | 123/18 A |
| 2,416,846 A * | 3/1947 | Richter | ...................... | 123/18 A |
| 2,544,480 A * | 3/1951 | Bancroft | ........................ | 418/37 |
| 2,651,206 A * | 9/1953 | La Veille | ........................ | 74/25 |
| 2,899,944 A * | 8/1959 | Patkau | ........................ | 418/37 |
| 3,186,383 A * | 6/1965 | Potter | ........................ | 418/35 |
| 3,304,923 A * | 2/1967 | Parenti | ...................... | 123/51 R |
| 3,338,137 A * | 8/1967 | James | ...................... | 123/18 A |
| 3,396,632 A * | 8/1968 | Leblanc | ........................ | 418/36 |
| 3,580,228 A * | 5/1971 | Rocha et al. | ............... | 123/18 A |
| 3,922,118 A * | 11/1975 | Bancroft | ........................ | 418/37 |
| 4,072,447 A * | 2/1978 | Gaspar | ........................ | 418/36 |
| 4,136,661 A * | 1/1979 | Posson | ........................ | 123/205 |
| 4,311,442 A * | 1/1982 | Simon | ........................ | 418/37 |
| 4,344,288 A * | 8/1982 | Heaton | ........................ | 60/595 |
| 5,074,253 A * | 12/1991 | Dettwiler | .................. | 123/18 A |
| 5,112,204 A * | 5/1992 | Parsons | ........................ | 418/36 |
| 5,203,287 A * | 4/1993 | Wiley | ........................ | 123/18 A |
| 5,560,324 A * | 10/1996 | Howard | .................... | 123/18 A |
| 5,740,765 A * | 4/1998 | Ball et al. | .................. | 123/18 R |
| 5,794,573 A * | 8/1998 | Sunley | ........................ | 123/18 R |
| 5,996,538 A * | 12/1999 | Rocha et al. | ............... | 123/18 A |
| 6,321,693 B1 * | 11/2001 | Kim et al. | .................. | 123/18 R |
| 6,382,143 B2 * | 5/2002 | Taurozzi | .................... | 123/18 A |
| 6,461,127 B1 * | 10/2002 | Kim | ............................ | 418/36 |
| 6,880,494 B2 * | 4/2005 | Hoose | ........................ | 123/18 A |

\* cited by examiner

*Primary Examiner*—Thomas Denion
*Assistant Examiner*—Douglas J. Duff
(74) *Attorney, Agent, or Firm*—Brinks Hofer Gilson & Lione

(57) ABSTRACT

The invention concerns an internal-combustion engine, the engine comprising an engine housing having a first wall delimiting a first combustion chamber, a first connecting rod having a first piston and a second connecting rod having a second piston. The pistons also delimit the first combustion chamber. The first wall defines at least a section of a torus, and the pistons are guided along a curved path defined by the section of the torus. The connecting rods are coupled to an intermediate member, which travels bi-directionally between two end positions and the intermediate member is coupled to a crankshaft.

18 Claims, 2 Drawing Sheets

INTERNAL COMBUSTION ENGINE

BACKGROUND OF THE INVENTION

The invention concerns an internal-combustion engine, the engine comprising an engine housing having a first wall delimiting a first combustion chamber, a first connecting rod having a first piston and a second connecting rod having a second piston. The pistons also delimit the first combustion chamber The first wall defines at least a section of a torus, and the pistons are guided along a curved path defined by that section of the torus.

It is the underlying purpose of the invention to provide a combustion engine, which is compact and simple in construction.

SUMMARY OF THE INVENTION

This object is achieved in accordance with the invention with a combustion engine of the above-mentioned type by providing an intermediate member which is coupled to the connecting rods, which travels bi-directionally between two end positions, and which is coupled to the crankshaft.

In contrast to conventional combustion engines, the inventive combustion engine has a combustion chamber which is not only delimited by a wall of the engine housing and a first piston, but also by a second piston. The pistons can be provided as separate parts that are attached to the connecting rods. The pistons can also be integral parts of the connecting rods. The wall of the engine housing defines at least a section of a torus in which the pistons are guided, so that the pistons travel along a curved path. When the combustion gas is ignited in a combustion chamber that is delimited as described, the two pistons are driven in opposite directions, i.e. forced apart. The gases expanding in the combustion chamber thereby drive not only one, but two pistons to substantially increase the efficiency of the engine. This reduces fuel consumption and improves emission values.

Since the pistons travel along a curved path, the inventive combustion engine is very compact for a given combustion chamber volume.

According to the invention, the intermediate member accepts the motion of the pistons and transmits this motion to the crankshaft. The intermediate member and a single crankshaft can thereby replace two crankshafts and further means for coupling the two crankshafts. The inventive engine is therefore very compact and easy to manufacture.

Advantageously, the pistons move in opposite directions and simultaneously during expansion of the combustion gases, i.e. the forces and torques generated are largely compensated for. Vibrations are thereby almost completely compensated for, such that special devices such as e.g. balancer shafts etc. are not required.

In a preferred embodiment, the first connecting rod comprises a third piston and the second connecting rod comprises a fourth piston, wherein the third piston and the fourth piston delimit a second combustion chamber. This allows for a very compact arrangement of two combustion chambers. Each connecting rod delimits a first combustion chamber at one end by means of a piston and a second combustion chamber at its other end by means of another piston. Therefore, a stroke decreasing the size of one combustion chamber increases the size of the other combustion chamber and vice versa. Idle strokes of the pistons are thereby avoided and corresponding losses due to friction are minimized.

A wall having the shape of a torus can delimit the first and the second combustion chambers. The second combustion chamber can also be delimited by a separate, second wall which also defines at least a section of a torus. Within the scope of this invention, a torus is defined as a ring-shaped body, which can have any cross sectional shape, e.g. circular, square, rectangular or elliptical.

The two connecting rods preferably pivot about a common pivot axis. This reduces the size of the engine and minimizes the number of parts needed to position the pistons. The two combustion chambers and the two interposed connecting rods are advantageously arranged in a symmetrical manner to minimize engine vibrations.

It is particularly preferred when the crankshaft rotates around a rotation axis that is coaxial with the pivot axis. In this manner, the motion of the pistons and the connecting rods can be transferred to the intermediate member and from there to the crankshaft in a symmetrical manner. The coaxial arrangement of the pivot axis and the rotation axis of the crankshaft also contributes to a very compact construction of the engine.

In a further embodiment of the invention, the intermediate member is interposed between planes defined by the pivoting motion of the connecting rods. In this manner, forces acting in transverse directions and thereby inducing unwanted torques loads can be minimized.

In a particularly preferred embodiment of the invention, the connecting rods and the intermediate member are coupled to each other via a turning and sliding joint. Each joint is disposed between a connecting rod and the intermediate member, to allow turning and sliding of each connecting rod with respect to the intermediate member. The intermediate member can be coupled to the crankshaft in a similar manner.

The intermediate member preferably has a receiving area for accommodating corresponding engaging members of the connecting rods. The engaging members can be bolts that are received in a slot-like area provided in or at the intermediate member. This provides for a very robust and reliable transfer of motion and forces from the connecting rods to the intermediate member.

Clearly, within the scope of this invention, the intermediate member can comprise an engagement member that is received in corresponding receiving areas of the connecting rods.

The intermediate member has a receiving area for receiving a corresponding engaging member of the crankshaft in order to transfer motion and forces from the intermediate member to the pistons. In a particularly preferred embodiment, this receiving area is the same as the receiving area provided for the engaging members of the connecting rods.

According to an alternative embodiment of the invention, the intermediate member comprises an engagement member that is received in a corresponding receiving area of the crankshaft.

It is particularly preferred when the intermediate member is guided by guiding means extending parallel to the axis along which the intermediate member travels. These guiding means can comprise parallel columns, along which the intermediate member slides and travels back and forth between its end positions.

The inventive combustion engine may be a two-cycle or four-cycle engine, wherein the Otto principle as well as the diesel principle may be used.

Further advantages, features and details of the invention can be extracted from the dependent claims and the following description, which describes in detail a particularly preferred embodiment with reference to the drawing. The features shown in the drawing and mentioned in the claims and in the description may be essential to the invention either individually or in arbitrary combination.

DESCRIPTION OF THE PREFERRED EMBODIMENT

Figure 1:
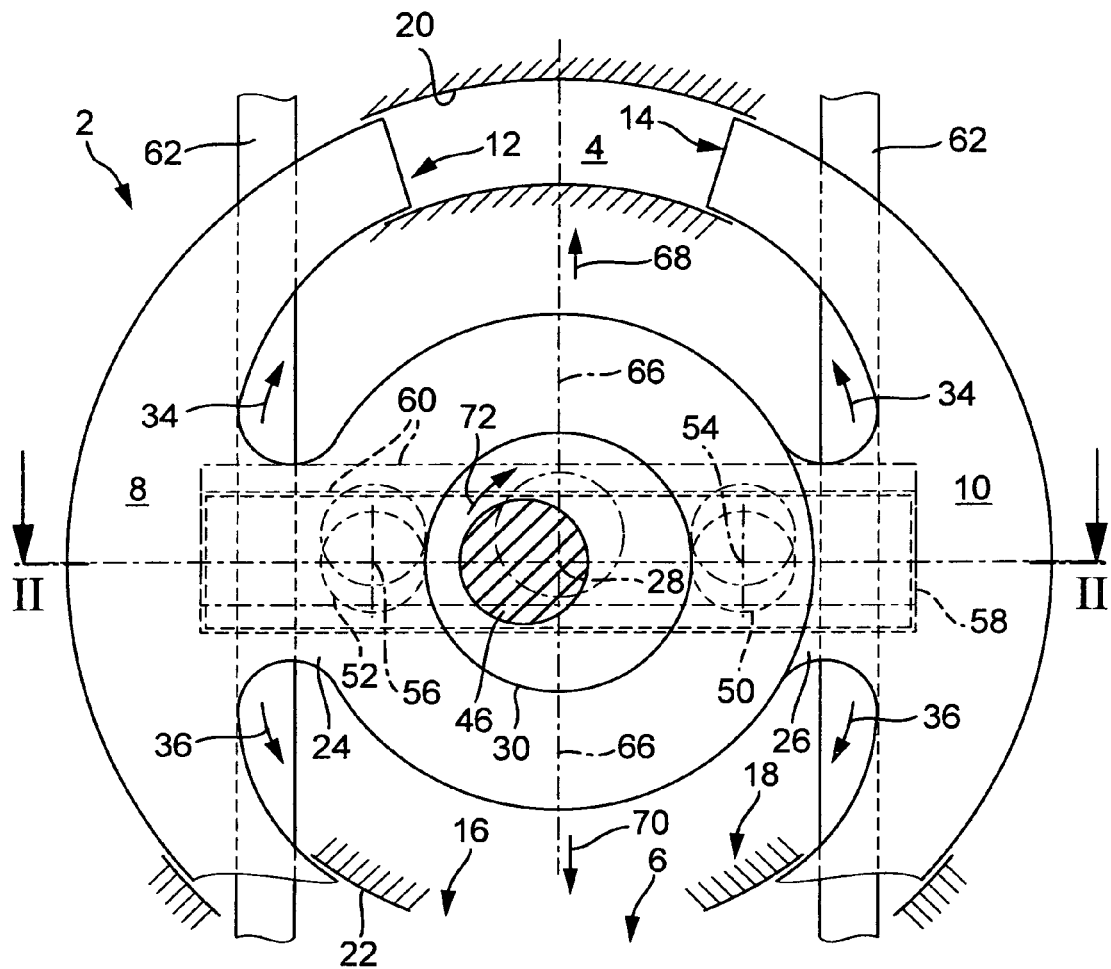
FIG. 1 shows a schematic side view of a combustion engine according to the invention.

FIG. 1 shows the main parts of an inventive internal combustion engine 2. This engine comprises two combustion chambers, a first combustion chamber 4 and a second combustion chamber 6 (not shown in the drawing), which is arranged symmetrically opposite the first combustion chamber 4. The engine 2 has a first connecting rod 8 and a second connecting rod 10, which are arranged in a symmetrical manner. The first connecting rod 8 comprises a first piston 12 at one end and a third piston 16 at its other end. The second connecting rod 10 comprises a second piston 14 at one end and a fourth piston 18 at its other end. The pistons 16 and 18 are not shown in the drawing: they are identical to the pistons 12 and 14.

The pistons 12 to 18 have a torus shape and are an integral part of the connecting rods 8 and 10. An alternative embodiment of a connecting rod with two pistons, that are provided as separate parts, is described with respect to FIG. 3.

The first combustion chamber 4 is not only delimited by the pistons 12 and 14, but also by a first wall 20, which is provided by a housing of the engine. The second combustion chamber 6 is delimited accordingly by a second wall 22. The walls 20 and 22 have the shape of a section of a torus and the ends of these sections guide the ends of the connecting rods 8 and 10 on which the pistons 12 to 18 are disposed.

The connecting rod 8 has a pivot arm 24, which extends in a radial direction towards the center of the engine 2. The connecting rod 10 has a corresponding pivot arm 26. The pivot arms 24 and 26 pivot around a common pivot axis 28. The pivot axis 28 extends in a direction, which is perpendicular to the plane of the drawing.

The pivot arm 24 of the connecting rod 8 is held at a bearing 30, that runs on a crank shaft 42. Accordingly, the pivot arm 26 of the connecting rod 10 is held at a bearing 32, that runs on the crank shaft 42 (also cf. FIG. 2).

Figure 2:
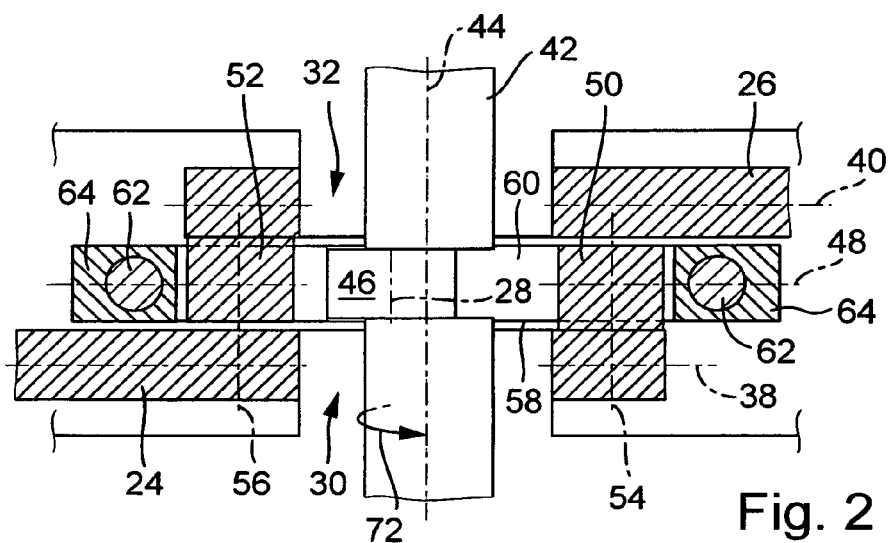
FIG. 2 shows a section taken along the line II-II as indicated in FIG. 1.

When the connecting rods 8 and 10 pivot around the common pivot axis 28 as illustrated by arrows 34, they move in such a way that they compress gas contained in combustion chamber 4. The connecting rods 8 and 10 can also pivot in opposite directions, as illustrated by arrows 36. When the connecting rods 8 and 10 pivot back and forth according to directions 34 and 36, they move within corresponding planes 38 and 40, as indicated in FIG. 2.

The crankshaft 42 extends in a direction perpendicular to these planes 38 and 40 and rotates around a rotation axis 44, which is coaxial with the pivot axis 28.

The crankshaft 42 comprises a lobe 46, which is arranged in a plane 48, which is interposed between the planes 38 and 40.

The pivot arm 24 of the connecting rod 8 comprises a bolt-shaped engaging member 50, which is disposed at the end of the pivot arm 24, which faces the connecting rod 10. Accordingly, the pivot arm 26 of the connecting rod 10 carries a bolt-shaped engaging member 52, which is disposed at the end of the pivot arm 26 facing the connecting rod 8. The central axis of the engaging members 50 and 52 are designated 54 and 56, respectively. These central axes can be turning axes, when the engaging members 50 and 52 are rotatably disposed at the pivot arms 24 and 26, respectively.

The engaging member 50 could also be arranged closer to the connecting rod 8, e.g. at the central axis 56. Accordingly, the engaging member 52 could also be arranged closer to the connecting rod 10, e.g. at the central axis 54.

With respect to FIGS. 1 and 2, the engine 2 comprises an intermediate member 58, which has the shape of a frame. This frame is arranged within the plane 48. The intermediate member 58 has an open receiving area 60, in which the engaging members 50 and 52 and the lobe 46 of the crankshaft 42 are disposed.

The engine 2 also comprises guiding means 62, which include two parallel columns. These are received in bearing parts 64, which are integrated at the side ends of the intermediate member 58 (see FIG. 2). The intermediate member 58 can move along an axis 66, which extends in a direction parallel to the direction in which the guiding means 62 extend. The intermediate member 58 can therefore move along the axis 66 in an upward direction 68 or in downward direction 70.

Motion of the connecting rods 8 and 10 is transferred to the crankshaft 42 as follows. When connecting rods 8 and 10 move in pivot direction 36 (to thereby increase the size of the combustion chamber 4 and decrease the size of opposite combustion chamber 6), the engaging members 50 and 52 travel along a circular path in a substantially upward direction. The displacement of the engaging members 50 and 52 is illustrated in FIG. 1 by means of dashed lines (original position) and dashed-dotted lines (after pivot movement in direction 36). The engaging members 50 and 52 engage the receiving area 60 of the intermediate member 58 and thereby drive the intermediate member 58 in an upward direction 68. The corresponding displacement of the intermediate member 58 is illustrated in FIG. 1 by means of dashed and dashed-dotted lines.

The intermediate member 58 with its receiving area 60 is also in contact with the lobe 46 of the crankshaft 42. Therefore, when the intermediate member 58 travels in the upward direction 68, the lobe 46 is displaced accordingly, which is indicated by dashed-dotted lines. The displacement of the lobe 46 causes a rotational movement 72 of the crankshaft 42.

Figure 3:
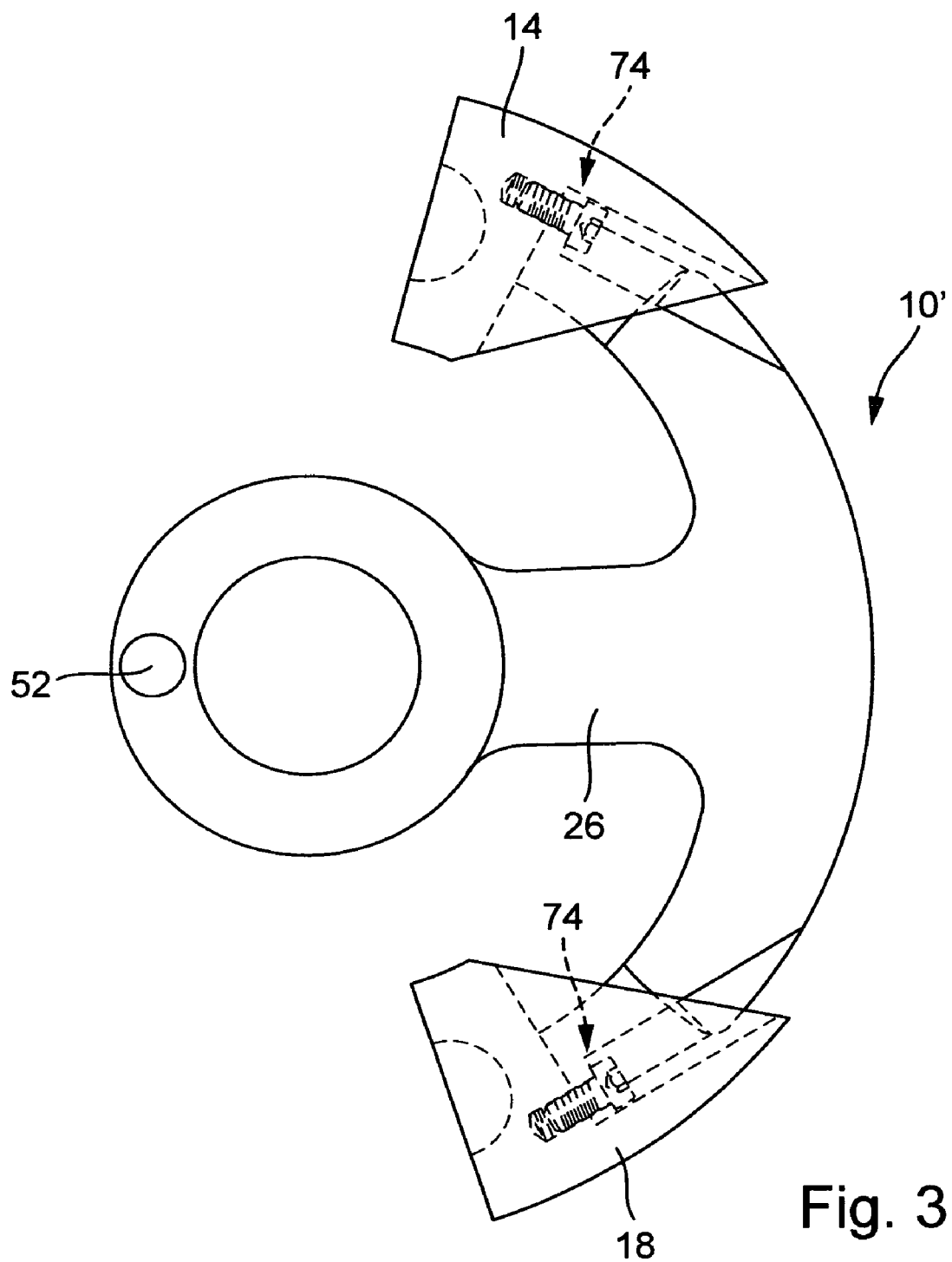
FIG. 3 shows an alternative embodiment of a connecting rod with two pistons.

FIG. 3 shows a connecting rod 10', which is provided with two pistons 14 and 18 that are attached to the connecting rod 10' by fastening means 74.

I claim:

1. An internal-combustion engine, the engine comprising:
an engine housing having a first wall and a second wall defining at least a section of a torus between the first wall and the second wall and delimiting a first combustion chamber;
a first connecting rod having a first piston, said first piston also delimiting said first combustion chamber, said first connecting rod guided along a curved path defined by said section of said torus;
a second connecting rod having a second piston also delimiting said first combustion chamber, said second piston guided along a curved path defined by said section of said torus;
an intermediate member coupled to said first and said second connecting rods, said intermediate member traveling linearly between two end positions to effect rotation of the first piston and second piston towards and away from each other such that the first piston and second piston do not complete a full revolution, wherein said intermediate member is guided by parallel columns; and a crankshaft coupled to said intermediate member.

2. The combustion engine of claim 1, wherein said first and said second pistons move in opposite directions.

3. The combustion engine of claim 1, wherein said first and said second pistons move simultaneously.

4. The combustion engine of claim 1, wherein said first connecting rod has a third piston and said second connecting rod has a fourth piston, wherein said third piston and said fourth piston delimit a second combustion chamber.

5. The combustion engine of claim 4, wherein said second combustion chamber is delimited by said first wall.

6. The combustion engine of claim 4, wherein said second combustion chamber is delimited by a second wall, said second wall defining at least a section of a torus.

7. The combustion engine of claim 1, wherein said first and said second connecting rods pivot around a common pivot axis.

8. The combustion engine of claim 7, wherein said crankshaft rotates around a rotation axis that is coaxial with said pivot axis.

9. The combustion engine of claim 7 wherein said intermediate member is interposed between planes defined by said pivoting movement of said first and said second connecting rods.

10. The combustion engine of claim 1, wherein said first and said second connecting rods and said intermediate member are coupled to each other by means of a turning and sliding joint.

11. The combustion engine of claim 1, wherein said intermediate member and said crankshaft are coupled to each other by means of a turning and sliding joint.

12. The combustion engine of claim 1, wherein said intermediate member defines a receiving area for receiving corresponding engaging members of said first and said second connecting rods.

13. The combustion engine of claim 1, wherein said intermediate member comprises engagement members received in associated receiving areas of said connecting rods.

14. The combustion engine of claim 1, wherein said intermediate member defines a receiving area for receiving a corresponding engaging member of said crankshaft.

15. The combustion engine of claim 1, wherein said intermediate member comprises an engagement member received in an associated receiving area of said crankshaft.

16. The combustion engine of claim 1, wherein the engine is a two-cycle, a four-cycle, an Otto or a diesel engine.

17. An internal-combustion engine, the engine comprising:

an engine housing having a first wall and a second wall defining at least a section of a torus between the first wall and the second wall and delimiting a first combustion chamber;

a first connecting rod having a first piston, said first piston also delimiting said first combustion chamber, the first piston being guided along the section of the torus between the first wall and the second wall of the engine housing;

a second connecting rod having a second piston also delimiting said first combustion chamber, the second piston being guided along the section of the torus between the first wall and the second wall of the engine housing;

an intermediate member coupled to said first and said second connecting rods, said intermediate member traveling linearly between two end positions, wherein said intermediate member is guided by parallel columns; and a crankshaft coupled to said intermediate member, wherein the first piston and second piston do not complete a full revolution.

18. An internal-combustion engine, the engine comprising:

an engine housing having a first wall and a second wall defining at least a section of a torus between the first wall and the second wall and delimiting a first combustion chamber;

a first piston, said first piston also delimiting said first combustion chamber and defining at least a section of a torus, said first piston guided along the section of the torus between the first wall and the second wall of the engine housing;

a second piston also delimiting said first combustion chamber and defining at least a section of a torus, said second piston guided along the section of the torus between the first wall and the second wall of the engine housing;

an intermediate member coupled to said first and said second pistons, said intermediate member traveling linearly between two end positions to effect rotation of the first piston and second piston towards and away from each other such that the first piston and second piston do not complete a full revolution, wherein said intermediate member is guided by parallel columns.

* * * * *